(12) United States Patent
Taylor et al.

(10) Patent No.: US 7,065,323 B2
(45) Date of Patent: *Jun. 20, 2006

(54) RF DYNAMIC CHANNEL SWITCHING METHOD

(75) Inventors: Ronald Taylor, Wheaton, IL (US); Eric V. Gonzales, Aurora, IL (US); James F. Wiemeyer, Homer Glen, IL (US)

(73) Assignee: Harrow Products, Inc., Montvale, NJ (US)

( * ) Notice: Subject to any disclaimer, the term of this patent is extended or adjusted under 35 U.S.C. 154(b) by 338 days.

This patent is subject to a terminal disclaimer.

(21) Appl. No.: 10/262,249

(22) Filed: Sep. 30, 2002

(65) Prior Publication Data

US 2003/0098779 A1 May 29, 2003

Related U.S. Application Data

(60) Provisional application No. 60/326,338, filed on Sep. 30, 2001, provisional application No. 60/326,299, filed on Sep. 30, 2001, provisional application No. 60/326,316, filed on Sep. 30, 2001, provisional application No. 60/326,298, filed on Sep. 30, 2001, provisional application No. 60/326,179, filed on Sep. 30, 2001, provisional application No. 60/326,296, filed on Sep. 30, 2001, provisional application No. 60/326,294, filed on Sep. 30, 2001, provisional application No. 60/326,295, filed on Sep. 30, 2001, provisional application No. 60/326,201, filed on Sep. 30, 2001.

(51) Int. Cl.
*H04B 1/00* (2006.01)
*H04B 15/00* (2006.01)
*H04B 17/00* (2006.01)
*H04Q 7/20* (2006.01)
*G05B 19/00* (2006.01)

(52) U.S. Cl. .................. 455/63.2; 455/67.1; 455/67.3; 455/425; 455/464; 340/5.61; 340/318; 340/539.16; 340/539.3

(58) Field of Classification Search ............... 455/425, 455/67.3, 67.1, 63.2, 464; 340/5.61, 539.3, 340/539.16, 318; 370/318
See application file for complete search history.

(56) References Cited

U.S. PATENT DOCUMENTS

| | | | |
|---|---|---|---|
| 4,357,601 A | | 11/1982 | McWilliams |
| 4,672,365 A | * | 6/1987 | Gehman et al. ....... 340/539.16 |
| 5,019,803 A | * | 5/1991 | Maram .................... 340/539.3 |
| 5,075,608 A | | 12/1991 | Erdman et al. |
| 5,184,349 A | | 2/1993 | Riordan |
| 5,418,839 A | * | 5/1995 | Knuth et al. ................. 455/464 |
| RE35,124 E | | 12/1995 | Erdman et al. |
| 5,491,471 A | | 2/1996 | Stobbe |

(Continued)

FOREIGN PATENT DOCUMENTS

FR 2749607 12/1997

(Continued)

*Primary Examiner*—William D. Cumming
(74) *Attorney, Agent, or Firm*—Michael Best & Friedrich LLP

(57) ABSTRACT

In an access control system, a method and system for dynamic channel selection to select a channel for communication between a Wireless Access Point Module (WAPM) and a Wireless Panel Interface Module (WPIM). A number of communication channels are available. The WAPM attempts to communicate over a first channel and selects a second channel if the first channel is unsuccessful. The WPIM scans all the available channels so that communication may be established regardless of the channel chosen by the system. Alternatively, the available channels may be segmented into groups and an individual WAPM may be assigned to a group of channels rather than a single channel.

18 Claims, 4 Drawing Sheets

U.S. PATENT DOCUMENTS

| | | |
|---|---|---|
| 5,497,411 A | 3/1996 | Pellerin |
| 5,577,229 A | 11/1996 | Wakerly |
| 5,682,135 A | 10/1997 | LaBonde et al. |
| 5,774,059 A | 6/1998 | Henry et al. |
| 5,808,296 A | 9/1998 | McMonagle et al. |
| 5,812,782 A | 9/1998 | Jackson |
| 5,847,662 A | 12/1998 | Yokota et al. |
| 5,867,095 A | 2/1999 | Klein et al. |
| 5,884,145 A * | 3/1999 | Haartsen .................... 455/63.2 |
| 5,901,361 A | 5/1999 | Luong |
| 5,936,544 A | 8/1999 | Gonzales et al. |
| 5,941,106 A | 8/1999 | Williamson, Jr. et al. |
| 5,974,367 A | 10/1999 | Bianco |
| 6,167,251 A | 12/2000 | Segal et al. |
| 6,185,415 B1 | 2/2001 | Boatwright |
| 6,237,028 B1 | 5/2001 | Jackson |
| 6,260,392 B1 | 7/2001 | Geiger |
| 6,326,754 B1 | 12/2001 | Mullet et al. |
| 6,352,202 B1 | 3/2002 | Takiguchi et al. |
| 6,359,547 B1 | 3/2002 | Denison et al. |
| 6,377,608 B1 | 4/2002 | Zyren |
| 6,392,537 B1 | 5/2002 | Tazumi et al. |
| 6,486,793 B1 | 11/2002 | Buccola |
| 6,776,332 B1 | 8/2004 | Allen et al. |
| 2001/0021639 A1 | 9/2001 | Kaku |
| 2001/0055283 A1 | 12/2001 | Beach |
| 2002/0163430 A1 | 11/2002 | Bergman et al. |
| 2003/0025082 A1 | 2/2003 | Brewington et al. |
| 2003/0096607 A1* | 5/2003 | Taylor ........................ 455/425 |
| 2003/0098778 A1* | 5/2003 | Taylor et al. .............. 340/5.61 |
| 2003/0098779 A1* | 5/2003 | Taylor et al. .............. 340/5.61 |
| 2003/0100266 A1* | 5/2003 | Wiemeyer et al. ......... 455/67.3 |
| 2003/0103472 A1* | 6/2003 | Taylor et al. .............. 370/318 |
| 2003/0143956 A1* | 7/2003 | Taylor ........................ 455/67.1 |
| 2004/0099723 A1 | 5/2004 | Robertson |
| 2004/0236547 A1 | 11/2004 | Rappaport et al. |
| 2005/0003812 A1 | 1/2005 | Gladwin et al. |

FOREIGN PATENT DOCUMENTS

| | | |
|---|---|---|
| WO | WO 02/25040 | 3/2002 |

* cited by examiner

RF DYNAMIC CHANNEL SWITCHING METHOD

RELATED APPLICATIONS

The present application claims priority to the following provisional applications all filed Sep. 30, 2001: Application No. 60/326,338, entitled "RF Channel Linking Method and System"; Application No. 60/326,299, entitled "Energy Saving Motor-Driven Locking Subsystem"; Application No. 60/326,201 entitled "Cardholder Interface for an Access Control System"; Application No. 60/326,316, entitled "System Management Interface for Radio Frequency Access Control"; Application No. 60/326,298 entitled "Power Management for Locking System"; Application No. 60/326,179, entitled "General Access Control Features for a RF Access Control System"; Application No. 60/326,296, entitled "RF Wireless Access Control for Locking System"; Application No. 60/326,294, entitled "Maintenance/Trouble Signals for a RF Wireless Locking System"; and Application No. 60/326,295, entitled "RF Dynamic Channel Switching Method."

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The preferred embodiments of the present invention relate to an RF access control system for controlling access to an access point. More specifically, the preferred embodiments of the present invention relate to a method and system for a wireless access control system including the ability to dynamically alter its RF communication channel, for example, in response to interference.

A wireless access control system may provide several advantages over a traditional, wire-based access control system. In a traditional, wired access control system, each access point, such as a door, for example, is equipped with a locking module to secure the access point. Each locking module is in turn directly wired to a remote access control module. The access control module is typically a database that compares a signal received from the locking module to a stored signal in the database in order to determine an access decision for that locking module. Once the access decision has been determined by the access control module, the decision is relayed to the locking module through the wired connection.

The use of wired connections between the access control module and the locking module necessitates a large investment of time and expense in purchasing and installing the wires. For example, for larger installations, literally miles of wires must be purchased and installed. An access control system that minimizes the time and expense of the installation would be highly desirable.

Additionally, wire-based systems are prone to reliability and security failures. For example, a wire may short out or be cut and the locking module connected to the access control module by the wire may no longer be under the control of the access control module. If a wire connection is cut or goes, the only alternative is to repair the faulty location (which may not be feasible) or run new wire all the way from the access control module to the locking module, thus incurring additional time and expense. Conversely, an access control system that provides several available communication channels between the locking module and the access control module so that if one communication channel is not usable, communication may proceed on one of the other communication channels, would also be highly desirable, especially if such an access control system did not add additional costs to install the additional communication channels.

A wireless access system providing a wireless communication channel between the locking module and the access control module may provide many benefits over the standard, wire-based access control system. Such a wireless access system is typically less expensive to install and maintain due to the minimization of wire and the necessary installation time. Additionally, such a system is typically more secure because communication between the locking module and the access control module is more robust that a single wire.

Consequently, a wireless access system having a plurality of wireless communication channels that may be used by any locking module would be highly desirable.

BRIEF SUMMARY OF THE INVENTION

A system and method for dynamic channel selection in a wireless access control system is presented. The wireless access control system included a Wireless Access Point Module (WAPM) and a Wireless Panel Interface Module (WPIM) that may communicate over any of a plurality of communication channels. The WAPM transmits a data signal to the WPIM. Once the WPIM receives the data signal, the WPIM transmits a reply to the WAPM. If the WAPM does not receive a reply from the WPIM, the WAPM again transmits the data to the WPIM, but uses a different one of the plurality of available communication channels.

DETAILED DESCRIPTION OF THE INVENTION

The present application is directed toward a portion of a wireless access system. Additional disclosure of the wireless access system may be found in the following co-filed applications which are hereby incorporated by reference in their entirety: application Ser. No. 10/261,933, entitled "RF Channel Linking Method and System" filed Sep. 30, 2002; application Ser. No. 10/262,207, entitled "Energy Saving Motor-Driven Locking Subsystem" filed Sep. 30, 2002; application Ser. No. 10/262,509 entitled "Cardholder Interface for an Access Control System" filed Sep. 30, 2002; application Ser. No. 10/262,196, entitled "System Management Interface for Radio Frequency Access Control" filed Sep. 30, 2002; application Ser. No. 10/262,194 entitled "Power Management for Locking System" filed Sep. 30, 2002; application Ser. No. 10/262,507, entitled "General Access Control Features for a RF Access Control System" filed Sep. 30, 2002; application Ser. No. 10/262,077, entitled "RF Wireless Access Control for Locking System" filed Sep. 30, 2002; and application Ser. No. 10/262,508, entitled "Maintenance/Trouble Signals for a RF Wireless Locking System" filed Sep. 30, 2002.

Figure 1:
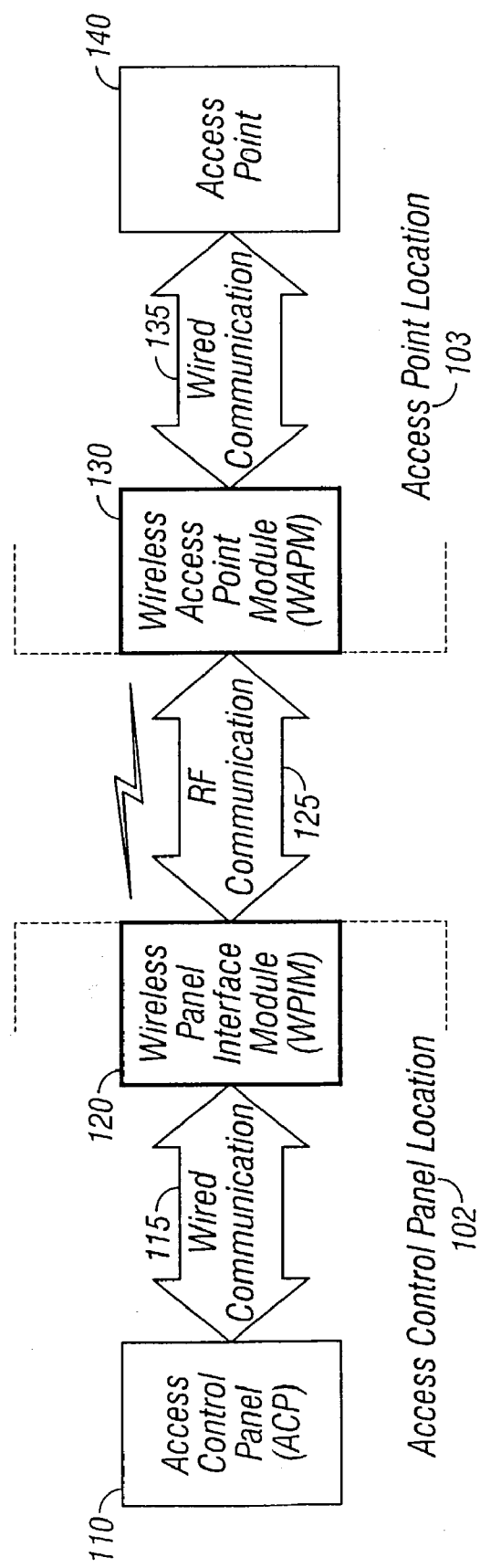
FIG. 1 illustrates a block diagram of the components of a wireless access system according to a preferred embodiment of the present invention.

FIG. 1 illustrates a block diagram of the components of a wireless access system 100 according to a preferred embodiment of the present invention. The wireless access system 100 includes several components installed at one of two generalized locations, an access control panel location 102 and an access point location 103. The access control panel location 102 includes an access control panel (ACP) 110 and a Wireless Panel Interface Module (WPIM) 120. The access point location 103 includes a Wireless Access Point Module (WAPM) 130 and an access point 140. The access control panel 110 communicates with the WPIM 120 through a bi-directional wired communication link 115. The WPIM 120 communicates with the WAPM 130 through a bi-directional RF communication link 125. The WAPM 130 communicates with the access point 140 through a bi-directional wired communication link 135. The access point 140 is preferably a door or portal, but may be a container, secure location, or a device of some kind, for example.

In operation, an access signal is read at the access point 140. The access signal may be a signal from an access card, for example, a magnetic stripe or Wiegand access card. Alternatively, the access signal may be a biometric or a numeric sequence or some other access signal. The access signal is relayed from the access point 140 to the WAPM 130 through the wired communication link 135. As further described below, the access point 140 may be integrated into the WAPM 130 to form a single component or may be a separate component wired to the WAPM 130.

Once the WAPM 130 receives the access signal from the access point 140, the WAPM 130 transmits the access signal to the WPIM 120 over the RF communication link 125. The WPIM 120 receives the access signal and relays the access signal to the ACP 110 over the wired communication link 115.

Figure 2:
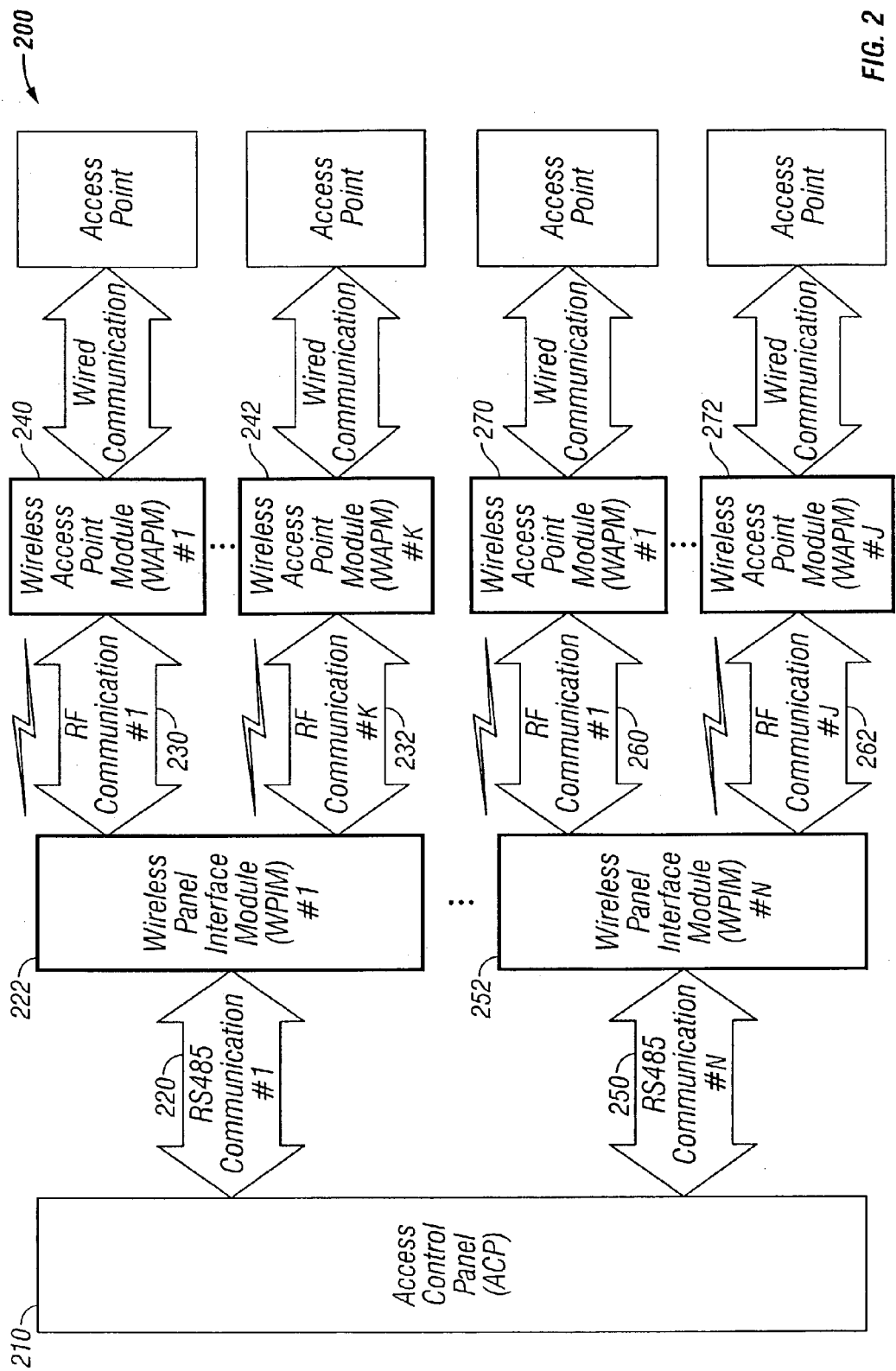
FIG. 2 illustrates a block diagram of the components of an expanded wireless access system according to a preferred embodiment of the present invention.

FIG. 2 illustrates a block diagram of the components of an expanded wireless access system 200 according to a preferred embodiment of the present invention. The expanded wireless access system 200 includes an ACP 210, multiple wired communication links 220, 222 numbered 1 to N, multiple WPIMs 222, 252 numbered 1 to N, multiple RF communication links 230, 2323, 260, 262 numbered 1 to K and 1 to J, and multiple WAPMs 240, 242, 270, 272 numbered 1 to K and 1 to J. The expanded wireless access system 200 is similar to the access system 100 of FIG. 1, and includes the same components, but has been expanded to include multiple access points, WAPMs, and WPIMs.

In the expanded wireless access system 200, a single ACP 210 communicates with a number N of WPIMs 222, 252 over a number N of wired communication links 220, 250. That is, the ACP supports communication with and provides access decisions for plurality of WPIMs 222, 252. Each WPIM 222, 252 may in turn support a plurality of WAPMs 240, 242, 270, 272 each WAPM positioned at a single access point. For example, WPIM #1 communicates with a number K of WAPMs 240, 242 over a number K of RF communication links 230, 232. Additionally, WPIM #N communicates with a number J of WAPMs 270, 272 over a number J of RF communication links 260, 262.

In a preferred embodiment, the ACP 210 supports three WPIMs and each PIM can support up to six WAPMs. However, as more advanced and configurable systems are developed, the total numbers of WPIMs and WAPMs supported is expected to rise. Additionally, the N wired communication links 220, 250 are illustrated as the preferred embodiment of RS486 communication links. Alternatively, other well-known communication protocols may be employed.

Figure 3:
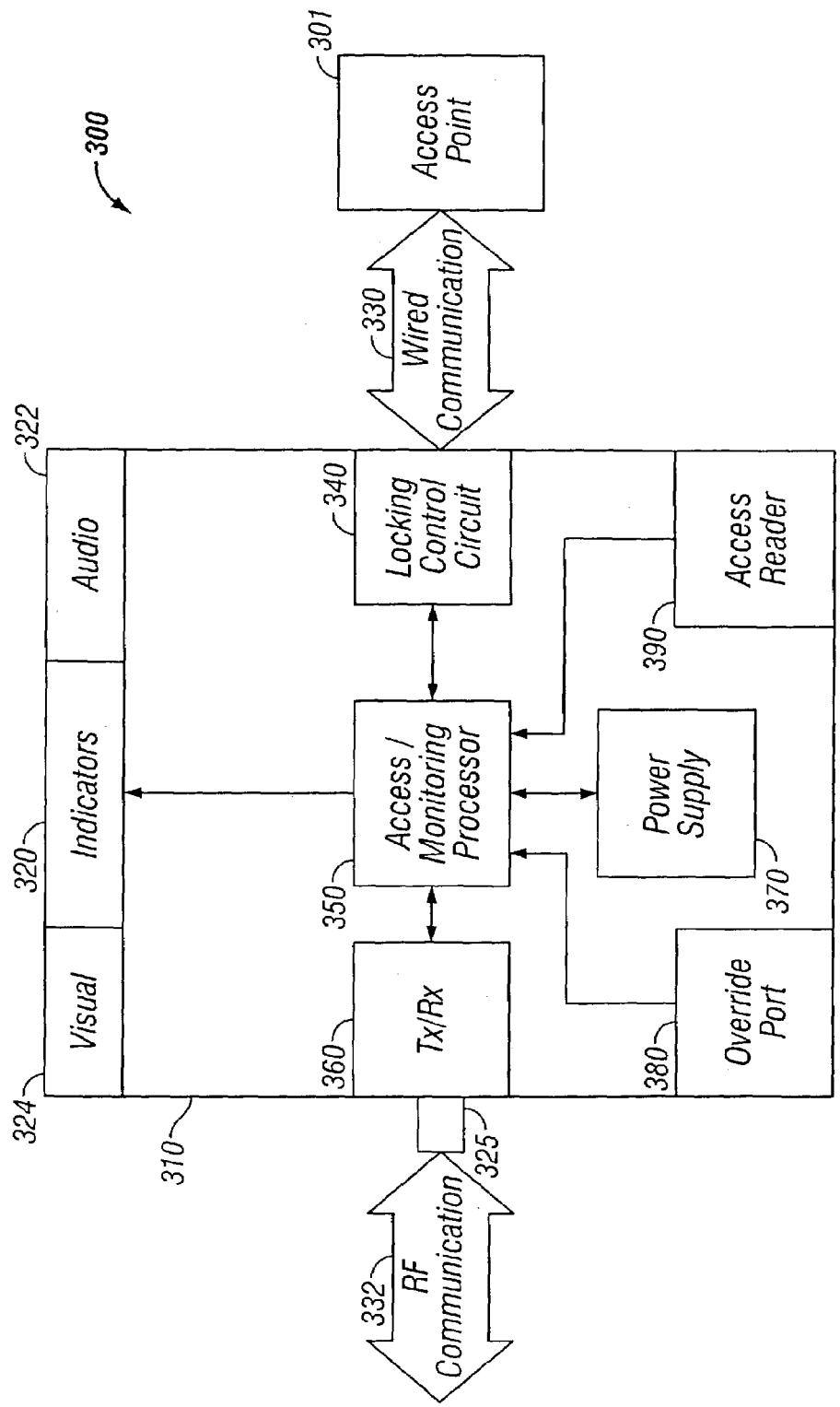
FIG. 3 illustrates a Wireless Access Point Module (WAPM) for the wireless access system of FIG. 1 according to a preferred embodiment of the present invention.

FIG. 3 illustrates a Wireless Access Point Module (WAPM) 300 for the wireless access system 100 of FIG. 1 according to a preferred embodiment of the present invention. The WAPM 300 includes a housing 310, indicators 320, a wired communication link 330, a RF communication link 332, and an antenna 325. The housing 310 includes a locking control circuit 340, an access/monitoring processor 350, a transceiver 360, a power supply 370, an override port 380, and an access reader 390. The indicators 320 may include one or both of an audio indicator 322 and a visual indicator 324. An access point 301 is also shown in FIG. 3.

The power supply 370 provides power to all of the other systems of the housing 310, including the transceiver 360, the locking control circuit 340, and the access/monitoring processor 350. The power supply 370 may be an internal battery or other internal type of power supply. Alternatively, an AC power supply may be employed. The transceiver 360 is coupled to the antenna 325 to allow signals to be sent and received from the housing 310 to an external point such as a WPIM through the RF communication link 332. The locking control circuit 340 is coupled to the access point 301 and provides locking control signals to the access point 301 through the wired communication link 330. Additionally, the locking control circuit 340 may receive feedback from the access point 301 through the wired communication link 330, for example to verify that the access point is secured. The access reader 390 receives access signals such as from an integrated card reader or other access device, for example. The indicators 320 may provide a visual or audio indication, for example of the state of the WAPM 300 or that an access signal has been read by the access reader 390.

In operation, an access signal may be received from the access reader 390. The access signal is then relayed to the access/monitoring processor 350. The access/monitoring processor 350 then sends the access signal to the transceiver 360. The transceiver 360 transmits the access signal to WPIM 120 of FIG. 1 that is interfaced to the ACP 110. As further explained below, the ACP 110 includes a database of authorized access signals. If the access signal received from the WAPM 300 is determined by the ACP 110 to be a signal corresponding to an authorized user, a confirmation is transmitted from the ACP 110 to the WPIM 120 and then to the transceiver 360 of the WAPM 300. The confirmation is relayed from the transceiver 360 to the access/monitoring processor 350. The access/monitoring processor 350 then sends a locking control signal to the locking control unit 340. When the locking control unit 340 receives the locking control signal, the locking control unit 340 activates the access point 301 through the wired communication link 330 to allow access. The indicators 320 may be a visual or audible signal that the housing 310 has read an access signal, transmitted the access signal to the remote access control panel, received a confirmation, or activated the locking member, for example.

The WAPM 300 may include several variations. For example, the WAPM may be an Integrated Reader Lock (WAPM), a Wireless Reader Interface (WRI), a Wireless Integrated Strike Interface (WISI), a Wireless Universal Strike Interface (WUSI), or a Wireless Portable Reader (WPR). The WAPM includes an integrated access reader and lock. That is, the WAPM is similar to FIG. 3, but includes the access point as part of the housing. The WRI is similar to the WAPM, but does not include an integrated access reader and instead receives signals from a third party access reader. The WISI includes an integrated reader and lock and is mounted directly into the strike of the access point, such as a door, for example. The WUSI is similar to the WISI, but does not include an integrated reader and lock and may instead be connected to a third party reader and/or lock. The WPR is a portable reader that may be taken to a remote location and determine access decisions at the remote location, for example, for security checks or badging checks.

Figure 4:
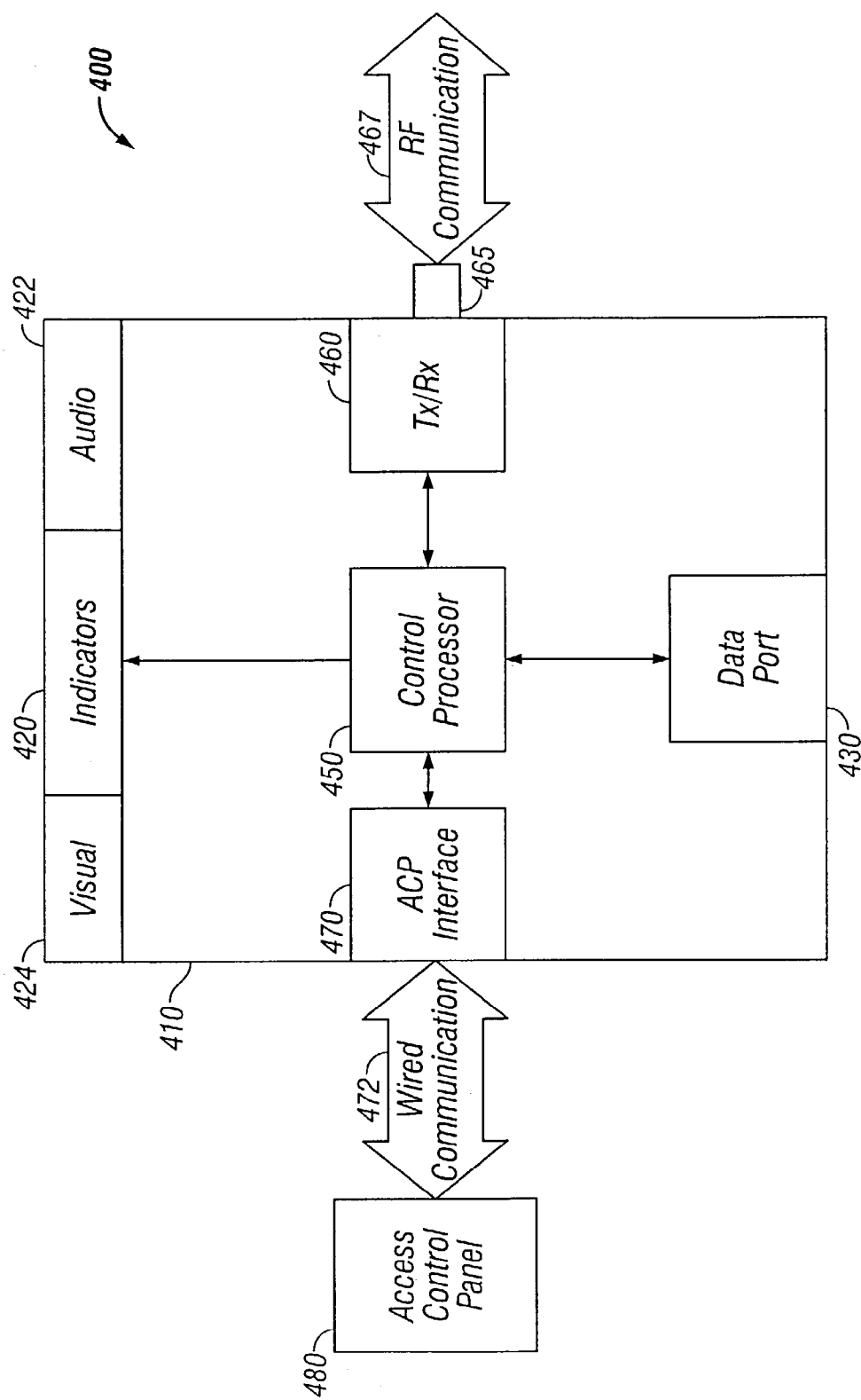
FIG. 4 illustrates a WPIM for the wireless access system of FIG. 1 according to a preferred embodiment of the present invention.

FIG. 4 illustrates a WPIM 400 for the wireless access system 100 of FIG. 1 according to a preferred embodiment of the present invention. The WPIM 400 includes a housing 410, an antenna 465, and indicators 420. The housing 410 includes a data port 430, a control processor 450, a transceiver 460 and an ACP interface 470. FIG. 4 also shows an RF communication link 467, a wired communication link 472, and an ACP 480.

Power is typically supplied to the WPIM via an AC power supply or through the wired communication 472. The transceiver 460 is coupled to the antenna 465 to allow signals to be sent and received from the housing 410 to an external point such as a WAPM through the RF communication link 467. The ACP 480 is coupled to the WPIM 400 through the wired communication link 472. The data port 430 is coupled to the control processor 450 to allow an external user such as a technician, for example, to interface with the control processor. The indicators 420 may provide a visual or audio indication, for example of the state of the WPIM 400 or that an access signal has been passed to the ACP 480 or an authorization passed to a WAPM 300.

In operation, the WPIM 400 receives access signals from the WAPM 300 through the antenna 465 and transceiver 460. The WPIM relays the access signals to the ACP 480 for decision making. Once the access decision has been made, the ACP 480 transmits the access decision through the wired communication link 472 to the WPIM 400. The WPIM 400 then transmits the access decision to the WAPM 300.

As mentioned above, the WPIM 400 includes a data port 430. The data port 430 is preferably an RS485 port. The data port 430 may be used, for example, by an operator to connect a computer to the WPIM 400 to perform various tasks, such as configuring the WPIM 400, for example. Some exemplary WPIM items for configuration include the transmission frequency for the communication link with the WAPM and the performance of the indicators 420.

Additionally, configuration information may be received by the data port 430 of the WPIM 400 and relayed to the WAPM 300 via the transceiver 460. The configuration information that is received by the WAPM 300 may then by relayed to the access/monitoring processor 350 of the WAPM 300 for implementation at the WAPM 300.

The WPIM may include several variations including a panel interface module (PIM) and a panel interface module expander (PIME). As mentioned above, a single PIM may communicate with multiple WAPMs. Additionally, the housing for the PIM is preferably constructed to allow additional PIM modules to be installed in the PIM housing to form the PIME. Because the PIME includes multiple PIM modules, the PIME may service more access points.

Communication between the WAPM and the WPIM may preferably takes place over one of several available communication channels. For example, 15 communication channels spaced over a frequency range of 902–928 MHz may preferably be employed. The WAPM and WPIM may initially select a first channel to use for communication. During the initial setup of the first channel or during operation, transmission over the first channel may become undesirable. For example, the first channel may become affected by interference. If the first channel is no longer able to adequately support communication, the WAPM and WPIM may dynamically switch to a different one of the 15 available communication channels. If the new channel is also not satisfactory, the WAPM and WPIM may switch to an additional channel and so on throughout all 15 available channels. Although the preferred embodiment employs 15 channels, a greater or small number of channels may also be employed.

Preferably, the WAPM and WPIM cycle through all available channels a predetermined number of times, for example three times. After cycling through all available channels a predetermined number of times, if the WAPM and WPIM are still unable to communicate, the WAPM and WPIM preferably cease attempting to communicate and instead indicate a failure condition.

With regard to dynamic channel switching during setup of the WAPM, the WPIM is preferably a scanning receiver and scans all 15 channels for communications from the WAPM. The WAPM preferably transmits an initial signal to the WPIM at a reduced power (for example, at half power) so that once a link has been established and the WAPM begins transmitting at full power, a strong signal is detectable by the WPIM. Once the WAPM has located the WPIM and established initial communication, the WAPM and WPIM then preferably send a series of data packets between each other to gauge the quality of the communication link. If the data packets are received with a number of errors within a predetermined error threshold, the communication link is considered valid and regular communication begins.

If the WAPM is unable to communicate with the WPIM over the first communication channel, the WAPM again attempts to communicate with the WPIM over a different communication channel. That is, the WAPM may then be dynamically switched to a new communication channel and the WAPM may again attempt communication over each of the 15 available communication channels. For example, if the WAPM is unable to establish a link with the WPIM or the link error rate is too high on one of the 15 channels, the WAPM automatically switches to a new channel and the WAPM may try each of the 15 channels.

Preferably, the WPIM is a RF channel scanning receiver scanning all available channels. The WPIM thus scans all 15 channels looking for a transmission from an WAPM. When the WAPM desires to communicate with the WPIM, the WAPM preferably transmits data on the last RF channel over which it was able to communicate with the WPIM. The scanning WPIM detects the communication from the WAPM and sends a response to the WAPM on the same channel. If the WAPM does not receive a response from the WPIM, then the WAPM transmits the data again over a different RF channel.

As mentioned above, the WAPM may be switched through each of the 15 available communication channels. If the WAPM has been switched through each of the 15 available communication channels and no link has been established with the WAPM, communication efforts are terminated and the WAPM preferably displays an error signal, preferably via the indicators 120.

Alternatively, the available communication channels may be grouped into multiple sets. Foe example, in a system having 15 available communication channels, the 15 available channels may be grouped into five sets of three channels each.

In a system using multiple groups of channels, a WAPM seeking to begin communicating with a WPIM may begin by picking an initial channel and attempting to communicate with the WPIM. The initial channel may be randomly generated or may be predetermined. As above, if the initial channel is unsuccessful, the WAPM may switch to a new channel. The new channel may also be randomly chosen or predetermined.

Once the WAPM finds a channel that supports communication with the WPIM, the WAPM is assigned a group of channels (rather than a single channel) for communication. For example, the following groupings may be employed:

| Group 1: | Chan 1 | Chan 6 | Chan 11 |
| Group 2: | Chan 2 | Chan 7 | Chan 12 |
| Group 3: | Chan 3 | Chan 8 | Chan 13 |
| Group 4: | Chan 4 | Chan 9 | Chan 14 |
| Group 5: | Chan 5 | Chan 10 | Chan 15 |

If the WAPM initially established communication over channel 6, for example, the WAPM is then assigned to Group 1. The assignment to Group 1 is established by the WPIM which transmits a channel group to the WAPM instead of a single channel.

Once the WAPM has been established to be in a certain group, if the channel that the WAPM is currently using becomes unable to support communication, for example, due to interference, the WAPM attempts to use the other channels in the group. If the WAPM attempts to communicate over all the other channels in the group a predetermined number or times but is not successful, the WAPM ceases trying to communicate an indicates an error condition.

Allocating the available communication channels into a number of subgroups in this fashion may help to reduce contention among the WAPMs and provide for more reliable communication.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features that come within the spirit and scope of the invention.

The invention claimed is:

1. In wireless access control system, a method for communicating between a Wireless Access Point Module (WAPM) and a Wireless Panel Interface Module (WPIM) using a plurality of wireless channels, the method comprising the steps of:

selecting to transmit from said WAPM to said WPIM using of said plurality of wireless channels;

determining an error rate of the one of the wireless channels;

automatically and randomly selecting another of said wireless channels when the error rate of the one of the wireless channels is above a threshold;

determining a second error rate of the selected other of the wireless channels; and transmitting from said WAPM to said WPIM using the other of said plurality of wireless channels if the second error rate of the other of the wireless channels is below the threshold.

2. The method of claim 1 wherein each of the available wireless channels is randomly cycled through to attempt to locate a channel whose error rate is below the threshold.

3. The method of claim 2 wherein each of the wireless channels is checked a plurality of times.

4. The method of claim 1 wherein the other of the channels is an adjacent channel in frequency.

5. The method of claim 1 wherein said plurality of channels are partitioned into a plurality of groups of channels.

6. The method of claim 5 wherein said WAPM is assigned to a specific group of channels.

7. The method of claim 6 wherein said WAPM attempts to communicate over other channels in said specific group when said WAPM is not able to communicate over a channel in said group.

8. The method of claim 7 wherein said WPIM no longer attempts to communicate after each channel in said group has been checked a plurality of times.

9. A radio frequency ("RF") access control system comprising:

a Wireless Access Point Module (WAPM); and a Wireless Panel Interface Module (WPIM) having a plurality of wireless channels for communication between said WAPM and said WPIM, and said WAPM is configured to transmit to said WPIM over one of the channels, to determine an error rate of the one channel, to automatically and randomly select another of the channels when the error rate of the one channel is above a threshold, to determine a second error rate of the selected other channel, and to transmit to said WPIM over the selected other channel if the second error rate of the other channel is below the threshold.

10. The system of claim 9 wherein each of the wireless channels is randomly cycled through to attempt to locate a channel whose error rate is below the threshold.

11. The system of claim 10 wherein each wireless channel is checked a plurality of times.

12. The system of claim 11 wherein at least one of said WAPM and said WPIM no longer attempts to communicate after each channel has been checked a plurality of times.

13. The system of claim 9 wherein the other channel is an adjacent channel in frequency.

14. The system of claim 9 wherein said plurality of channels are partitioned into a plurality of groups of channels.

15. The system of claim 14 wherein said WAPM is assigned to a specific group of channels.

16. The system of claim 15 wherein said WAPM attempts to communicate over other channels in said specific group when said WAPM is not able to communicate over a first channel in said group.

17. The system of claim 16 wherein said WPIM no longer attempts to communicate after each channel in said group has been checked a plurality of times.

18. The method of claim 1, wherein at least one of said WAPM and said WIPM no longer attempts to communicate after each of the channels has been checked a plurality of times.

* * * * *